US005920383A

United States Patent [19]

Chen et al.

[11] Patent Number: 5,920,383
[45] Date of Patent: Jul. 6, 1999

[54] MICROSCOPIC DIGITAL IMAGING STRAIN GAUGE

[75] Inventors: Fang Chen, Rochester Hills; Anthony M. Waas, Saline; Everett You-Ming Kuo, Troy; Howard Kiel Plummer, Jr., Dearborn; Thomas Eugene Allen, Royal Oak, all of Mich.

[73] Assignee: Ford Global Technologies, Inc., Dearborn, Mich.

[21] Appl. No.: 08/985,801

[22] Filed: Dec. 5, 1997

[51] Int. Cl.$^6$ ........................................ G01L 1/24
[52] U.S. Cl. ............................... 356/32; 73/800
[58] Field of Search ................ 73/800; 356/32

[56] References Cited

U.S. PATENT DOCUMENTS

| | | | |
|---|---|---|---|
| 3,767,308 | 10/1973 | Duffy | 356/32 |
| 4,591,996 | 5/1986 | Vachon. | |
| 4,690,001 | 9/1987 | Harvey et al. | 73/800 |
| 4,869,110 | 9/1989 | Kent et al. | |
| 5,011,280 | 4/1991 | Hung. | |
| 5,257,088 | 10/1993 | Tyson et al. | |
| 5,341,204 | 8/1994 | Grant et al. | |
| 5,568,259 | 10/1996 | Kamegawa. | |
| 5,723,794 | 3/1998 | Discenzo | 73/800 |
| 5,726,907 | 3/1998 | Davidson et al. | 356/32 |
| 5,747,699 | 5/1998 | Ebi | 73/800 |

FOREIGN PATENT DOCUMENTS 404127005  4/1992  Japan.

OTHER PUBLICATIONS

William N. Sharpe, Jr., "Interferometric Surface Strain Measurement", 1971, vol. 3, pp. 59–76, No. 1, *International Journal of Nondestructive Testing*.

*Primary Examiner*—Richard A. Rosenberger
*Attorney, Agent, or Firm*—Joseph W. Malleck

[57] ABSTRACT

A strain gauge includes an image sensing device having a lens, a magnification lens optically coupled to the lens, a positioning mechanism connected to the image sensing device, an image capture device for receiving an image from the image sensing device, and a processor for mathematically analyzing the image received from the image capture device and to calculate strain.

20 Claims, 1 Drawing Sheet

MICROSCOPIC DIGITAL IMAGING STRAIN GAUGE

FIELD OF THE INVENTION

The present invention relates to strain gauges, and more specifically, to microscopic digital imaging for such gauges.

BACKGROUND OF THE INVENTION

Strain measurement is of particular importance to automotive designers. In the design of automotive vehicles it is often necessary to measure hundreds of locations for strain for any given test. Conventional strain measurement is often conducted using an electrical strain gauge. Resistance strain gauges, extensometers, and capacitor strain gauges are examples of such conventional electrical gauges. Electrical strain gauges require bonding and wiring which, in an automotive testing environment, is a time consuming set up process. Also, once an electrical strain gauge is used it must be discarded which can be very costly in automotive testing. Further, conventional strain gauges are inaccurate when exposed to high temperatures which is an undesirable testing limitation in automotive design.

Efforts have therefore advanced in the automotive strain measurement field to develop a noncontacting and nonconsumable method of measuring strain. One such method known in the art is shearography. According to this method, two laterally-displaced images of the object, which consist of random speckle patterns, are made to interfere to form a pattern of fringes. The pattern is random, and depends on the characteristics of the surface of the object. When the object is deformed, by temperature, pressure, or other means, the random interference pattern will change. The amount of the change depends on the soundness of the object. A comparison of the random speckle patterns for the deformed and undeformed states, and their respective fringe patterns, gives information about the structural integrity of the object. The method is called shearography because one image of the object is laterally-displaced, or sheared, relative to the other image.

Another noncontacting and nonconsumable strain measurement method, which was developed with the advent of the laser, is electronic speckle pattern interferometry (ESPI). In ESPI, a beam of laser light is directed onto the test object and reflected onto an image sensor. At the same time, a reference beam is also directed towards the sensor. The reference beam may be a "pure" beam or it may be reflected from a "reference" object. Both the object beam and the reference beam are nearly parallel when they reach the image sensor, so the spatial frequency of the interference speckle patterns is relatively low. Thus, the image sensor can be a video camera, or its equivalent.

There are many disadvantages associated with shearography and ESPI. ESPI requires an object beam and a reference beam of coherent light. The presence of two distinct beams increases the complexity of the optical system. The ratio of intensities of the object and reference beams must be carefully controlled, and the path lengths of the beams must be matched. Also, the use of lasers present safety issues as well as high cost. Both ESPI and shearography are full field strain calculation methods and require highly complex, and relatively inaccurate, computational methods to derive strain. Further, ESPI and shearography are highly sensitive to vibration. The slightest movement of either the object or the apparatus can ruin the pattern. Thus both methods require special vibration isolation precautions, and are not practical for strain measurement in an automotive vehicle testing environment. Still further, both methods require that the object surface be painted or processed for testing which adds cost to the process. Finally, ESPI and shearography methods create noise which must be filtered by a noise reduction algorithm, further adding to the cumbersome nature of the processes.

Interferometric point wise, rather than full field, strain measurement is also an example of noncontacting strain measurement but is subject to the same shortcomings as ESPI. A problem associated with both full field and point wise noncontacting strain measurement, which is of great importance in automotive design and testing, is uninteruptibility of the method. That is, once the particular apparatus is set up to measure strain it can not be removed between pre-loading and post-loading. In automotive testing it is desired to take an initial, pre-load reading with the testing apparatus and then remove the apparatus for cycling. The automobile could, for example, be cycled for a predetermined period of time or distance with the apparatus being reapplied to the testing area for a post-load reading. This technique is impossible with the aforementioned noncontacting strain measurement methods.

Accordingly, a need exists in the art for an automotive vehicle strain gauge which is noncontacting, has an uncomplicated strain measurement calculation, is not subject to the harsh vibratory environment of an automobile, is removable between the pre versus post loading phase, and is reusable, accurate, and easy to use.

SUMMARY OF THE INVENTION

Responsive to the deficiencies in the prior art, the present invention provides a strain gauge including an image sensing device having a lens, a magnification lens optically coupled to the lens, a positioning mechanism connected to the image sensing device, an image capture device for receiving an image from the image sensing device, and a processor for mathematically analyzing the image received from the image capture device and to calculate strain.

An advantage of the present invention is that the present apparatus utilizes a microscopic lens which does not require a complex and sensitive optical system, therefore the present invention may be used in a harsh vibrating environment.

BRIEF DESCRIPTION OF THE DRAWINGS

Other features and advantages of the present invention will become apparent to those skilled in the strain measurement related arts upon reading the following description with reference to the accompanying drawings, in which.

DETAILED DESCRIPTION OF THE PREFERRED EMBODIMENT

Figure 1:
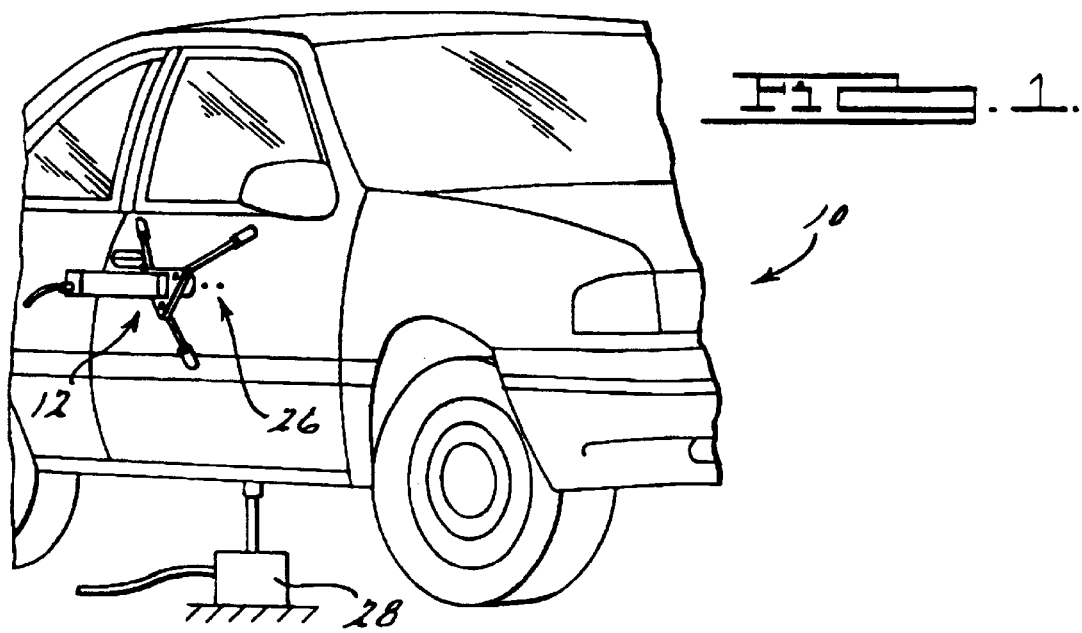
FIG. 1 is a perspective view of an automotive vehicle with the present strain measurement apparatus situated adjacent a vehicle door.

Turning now to the drawings, and in particular to FIG. 1 thereof, an automotive vehicle 10 has positioned adjacent thereto a microscopic digital imaging strain gauge 12. The gauge 12, of FIG. 2, includes a positioning mechanism 14, an image sensing device 16, a magnification lens 18, and a processor 20. The gauge 12 is positioned to image a micro/nano indentation, or micro/nano lithographic mark pattern 26 on an object surface for determining strain. The mark pattern 26 may also be produced on a thin metal or composite sheet and then adhere to the object surface. A dynamic loading device 28 with a trigger system may also be included, as well as coupled to the processor 20, for dynamic load strain testing.

Figure 2:
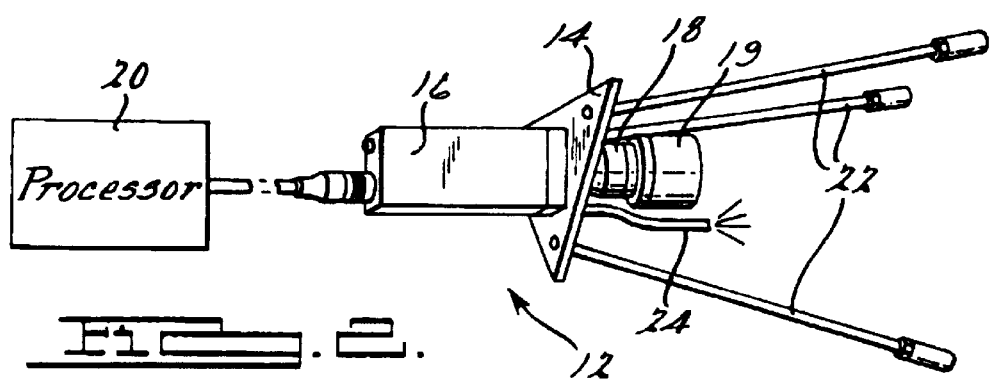
FIG. 2 is a perspective view of a microscopic digital imaging strain gauge according to the present invention.
Figure 3:
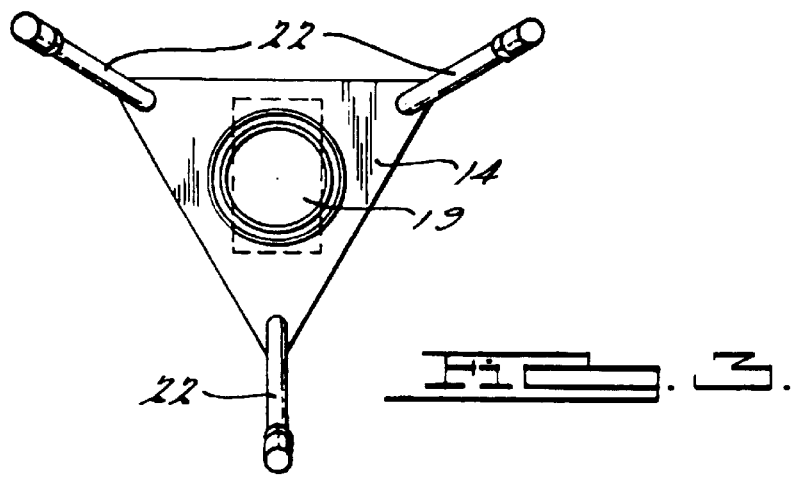
FIG. 3 is a bottom view of a microscopic digital imaging strain gauge according to the present invention.

As shown in FIG. 2, the image sensing device 16 is preferably a digital video recorder. The recorder may operate in either a color or gray scale. The sensing device 16 has a lens 19. The lens 19 is preferably a telecentric lens so that the size of the mark pattern will not be affected by the view angle and focus distance, especially in the case of a curved object surface. The sensing device 16 may further include a shutter mechanism, not shown, for taking "snap-shot" images of the object surface mark pattern 26 under dynamic loading.

A magnification lens 18, preferably a microscopic magnification lens, is preferably optically coupled to the lens 19 and is positioned intermediate the sensing device 16 and the lens 19. However, the lens 19 may be intermediate the magnification lens 18 and the image sensing device 16 or may be formed integral with the magnification lens 18. Further, an optical, scanning electron, transmission electron or scanning probe microscope may be used in place of the microscopic magnification lens without departing from the scope of the herein described invention.

A positioning mechanism 14 is attached to the sensing device 16. The positioning mechanism 14 preferably has three equidistantly spaced legs 22. The legs 22 are adapted to be longitudinally adjusted and locked in to place at a predetermined elevation above the object surface.

A fiber optic light source 24 may be attached to the apparatus 12 to illuminate a dimly lit object surface.

A processor 20 is coupled to the sensing device 16 and is adapted to receive a digital image. The processor has a digital imaging board with preferably a 30 Hertz digitizing rate. However, a high speed imaging board may be coupled with a high speed imaging device if the operating environment of the object surface so requires. The processor further has a computer for receiving information from the imaging board and for calculating the strain associated with a given object surface. The calculation utilizes a Young's fringe phase shift technique, as explained below and as known in the art, to interpret pre-load and post-load object surfaces. The Young's fringes are preferably processed using a low pass filter. The processor 20 may further be utilized to coordinate the trigger system of the dynamic loading device 28 with the shutter mechanism of the image sensing device 16 so that upon each triggered incremental dynamic load application, a "snap-shot" of the mark pattern 26 is taken.

In use, the positioning mechanism 14 is placed over a mark pattern 26 on an object surface and the distance between the imaging sensing device 16 and the mark pattern 26 is set by the adjustable legs and locked into place. The lens 19 is focused and the mark pattern image is taken by the image sensing device 16 before and after loading. The gauge 12 may be removed from the object surface if desired between pre and post-loading. The images are digitized into the computer via the digital imaging board. A digital Fourier transformation is then applied to the images of the marks before and after loading to produce Young's fringes. The number of fringes are related to the degree of distance between marked points. The displacement, as derived from the fringe patterns, between points of the mark pattern 26, pre and post deformation, are used to calculate strain at that region.

Only one embodiment of a microscopic digital imaging strain gauge of the present invention has been described. Those skilled in the strain gauge arts will appreciate that others may be possible without departing from the scope of the following claims.

We claim:

1. A strain gauge assembly comprising:

an object surface having a known applied mark pattern, an image sensing device having a lens;

a magnification lens optically coupled to the lens;

positioning means connected to the image sensing device for registering the image sensing device with respect to the mark pattern;

image capture means for receiving an image from the image sensing device; and processing means for mathematically analyzing the image received from the image capture means using digitally equivalent Youngs's fringes and to calculate strain.

2. A strain gauge according to claim 1 wherein the magnification lens and the lens are integral.

3. A strain gauge according to claim 1 wherein the image sensing device is a digital video camera.

4. A strain gauge according to claim 1 wherein the lens is a telecentric lens.

5. A strain gauge according to claim 1 wherein the positioning means is a tripod having equally spaced legs.

6. A strain gauge according to claim 5 wherein the equally spaced legs are height adjustable.

7. A strain gauge according to claim 1 wherein the image capture means is a digital imaging capture board having a 30 Hertz digitizing rate.

8. A strain gauge according to claim 1 wherein the processing means is a computer programmed to compute strain.

9. A strain gauge according to claim 1 wherein the apparatus further includes a fiber optic light source for illuminating the object surface.

10. A strain gauge according to claim 1 wherein, the imaging sensing device is one of a color or gray scale image sensing device.

11. An apparatus for determining strain associated with a surface, the apparatus comprising:

an object surface having an indented or imprinted mark pattern;

an imaging sensing device having a lens;

a microscopic lens optically coupled to and intermediately positioned between the imaging sensing device and the lens;

positioning means connected to the image sensing device for registering the image sensing device with respect to the mark pattern;

image capture means for receiving an image from the image sensing device; and processing means for mathematically analyzing the image received from the image capture means using digitally equivalent Young's fringes and for calculating strain.

12. An apparatus according to claim 11 wherein the image sensing device is a digital video camera.

13. An apparatus according to claim 11 wherein the lens is a telecentric lens.

14. An apparatus according to claim 11 wherein the positioning means is a tripod having equally spaced legs.

15. An apparatus according to claim 14 wherein the equally spaced legs are height adjustable.

16. An apparatus according to claim 11 wherein the image capture means is a digital imaging capture board having a 30 Hertz digitizing rate.

17. An apparatus according to claim 11 wherein the processing means is a computer programmed to compute strain.

18. An apparatus according to claim 11 wherein the apparatus further includes a fiber optic light source for illuminating the object surface.

19. An apparatus according to claim 11 wherein, the imaging sensing device is one of a color or gray scale image sensing device.

20. An apparatus for determining strain associated with a marked object surface, the apparatus comprising:

an object surface having a known applied mark pattern;

a digital video camera having a telecentric lens;

a microscopic lens optically coupled to and intermediately positioned between the digital video camera and the telecentric lens;

a plurality of adjustable legs connected to the video camera for registering the apparatus over the mark pattern in a stable and repeatable fashion;

an image capture board connected to the video camera for receiving an image of the mark pattern from the video camera; and a computer for mathematically analyzing the image received from the image capture board by use of digital Fourier transformation applied to the marks as holes or slits to create mathematically equivalent Young's fringes and thereby calculate strain.

* * * * *